A. RIEDLER.
ELASTIC DRIVE FOR POWER ENGINES.
APPLICATION FILED OCT. 12, 1917.

1,332,755.

Patented Mar. 2, 1920.

Inventor:
Alois Riedler,
By [signature]
Atty.

UNITED STATES PATENT OFFICE.

ALOIS RIEDLER, OF BERLIN, GERMANY.

ELASTIC DRIVE FOR POWER-ENGINES.

1,332,755.   Specification of Letters Patent.   Patented Mar. 2, 1920.

Application filed October 12, 1917. Serial No. 196,275.

*To all whom it may concern:*

Be it known that I, ALOIS RIEDLER, a subject of the Emperor of Germany, residing at No. 7 Rauchstrasse, Berlin, Germany, have invented certain new and useful Improvements in Elastic Drives for Power-Engines; and I do hereby declare the following to be a clear, full, and exact description of the invention, such as will enable others skilled in the art to which it appertains to make and use the same, reference being had to the accompanying drawing, and to letters or figures of reference marked thereon, which form a part of this specification.

This invention relates to an elastic drive for power engines. The object of the invention is to effect an elastic or resilient transmission of the twisting or turning moment in power engines provided with a crank drive and in which the irregular twisting moment produced by the power engine is not sufficiently equalized or balanced by gyrating masses.

The elastic drive according to this invention is particularly adapted to be applied to high-speed piston engines, for instance internal combustion engines for driving vehicles or impelling aeroplanes, boats or actuating machines for working metals or other materials, that is of machines, which are influenced in a detrimental manner by the irregular twisting moment of the driving engine and particularly by the maximum values of the twisting moments occurring in high-speed engines and producing shocks or impacts.

Figure 1:
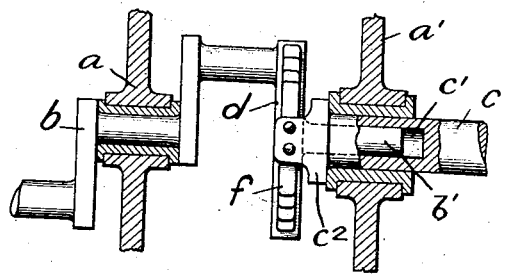

This invention will now be more particularly described with reference to the accompanying drawing, in which:

Figure 1 is a front view partly in section, and

Figure 2:
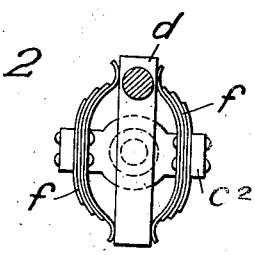

Fig. 2 a corresponding side view of a first embodiment of the invention.

Figure 3:
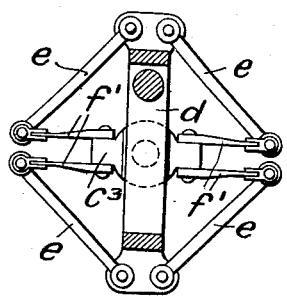

Fig. 3 shows a second, and

Figure 4:
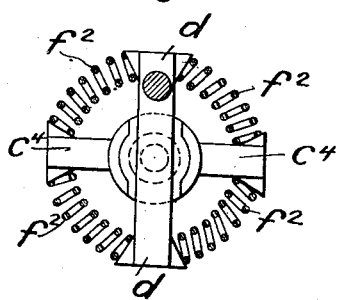

Fig. 4 a third construction according to the invention.

The crank-shaft $b$ is, as shown in Fig. 1, journaled in a bearing $a$ arranged between two of the crank arms. The end bearing $b'$ of the crank-shaft projects beyond the last crank-arm $d$ and is journaled in an axial bore $c'$ formed in that end of the driven shaft $c$ which is adjacent the crank-shaft. The end of the bearing end $b'$ is journaled in a bearing $a'$ so that the latter constitutes a bearing common to the end bearings of both shafts.

In the construction illustrated in Figs. 1 and 2 —$f$— denotes flat springs fixed to a cross piece —$c^2$— on the inner end of the driven part —$c$—. The outer ends of these springs rest on the side surfaces of the crank arm —$d$— and they positively clutch the crank arm in an elastic manner to the driven part —$c$— for the purpose of transmitting the twisting moment.

In the construction shown in Fig. 3 elastic or spring-arms —$f'$— are fixed to a cross piece —$c^3$— on the inner end of the driven part —$c$—. The outer ends of said arms —$f'$— are connected to the outer ends of the crank arm —$d$— by means of rods —$e$—.

In Fig. 4 the inner end of the driven part —$c$— has the shape of a double-arm —$c^4$— arranged at right angles to the crank arm —$d$—, so that these two parts form a cross. The side-surfaces of the double-arm —$c^4$— of the part —$c$— are positively connected to the facing side-surfaces of the crank arm —$d$— by means of helical springs —$f$—.

By providing an elastic drive according to this invention the twisting moment may be derived directly from the cranked portion of the crank shaft and the journal of this shaft on the driving side is relieved from great torsional stresses, so that the crank shaft is much more reliable in working and any danger of fracture near the outer journal of the crank shaft is removed. Owing to the equalization of the maximum values of the driving moment any motion transmitting gearings, screws and the like, which may be coupled to the driven part, are subjected to a much smaller stress and work with smaller losses of energy than has been hitherto the case. As a result of the new arrangement of the elastic drive also a considerable saving in weight and space is obtained.

What I claim now as my invention is:

1. In a resilient driving mechanism, the combination with a crank shaft of an engine, whose end crank arm is connected at one end to the end of the positively driven crank pin of the crank shaft; of a bearing common to both the end of the driven shaft and the end of said crank shaft on said crank arm, and a resilient connection between said crank arm and said driven shaft, whereby the bearing end of the crank shaft is relieved of some of the driving torque.

2. In a resilient driving mechanism, the combination with a crank shaft of an engine one of whose end crank arms is connected at one end to the end of the positively driven crank pin of said crank shaft and also has an alined crank shaft journal portion; of a driven shaft in alinement with the crank shaft, said alined crank shaft portion having bearing within the end of the driven shaft, and a resilient connection between the end of said driven shaft and said crank arm, and a bearing for the interfitting ends of said shafts.

3. In a resilient driving mechanism, the combination with a crank shaft of an engine one of whose end crank arms is connected at one end to the end of the positively driven crank pin of said crank shaft and also has an alined crank shaft portion; of a driven shaft in alinement with the crank shaft, said alined crank shaft portion and the end of the driven shaft interfitting, a bearing common to the interfitting portions of said shafts, and springs arranged to yieldingly connect said crank arm and driven shaft.

4. In a resilient driving mechanism, the combination with a crank shaft of an engine one of whose end crank arms is connected at one end to a positively driven crank pin of said crank shaft and also has an alined crank shaft portion, said arm being extended substantially symmetrically beyond the axis of the crank shaft; of a driven shaft, said crank shaft portion and the end of the driven shaft arranged to interfit, a bearing common to said interfitting portions, a spring carrier on the end of the driven shaft and springs between said carrier and said extended crank arm.

In testimony that I claim the foregoing as my invention, I have signed my name.

ALOIS RIEDLER.